(12) United States Patent
Cahill

(10) Patent No.: US 9,193,475 B2
(45) Date of Patent: Nov. 24, 2015

(54) SYSTEM AND METHOD FOR TIRE BURST DETECTION

(71) Applicant: Goodrich Corporation, Charlotte, NC (US)

(72) Inventor: Eric Cahill, Troy, OH (US)

(73) Assignee: GOODRICH CORPORATION, Charlotte, NC (US)

(*) Notice: Subject to any disclaimer, the term of this patent is extended or adjusted under 35 U.S.C. 154(b) by 257 days.

(21) Appl. No.: 13/929,389

(22) Filed: Jun. 27, 2013

(65) Prior Publication Data

US 2015/0002318 A1 Jan. 1, 2015

(51) Int. Cl.
*G08B 21/00* (2006.01)
*B64D 45/00* (2006.01)
*B60C 23/04* (2006.01)

(52) U.S. Cl.
CPC ............ *B64D 45/00* (2013.01); *B60C 23/0474* (2013.01)

(58) Field of Classification Search
CPC ....................................................... B64D 45/00
USPC ........................... 340/442, 945, 960; 73/146, 73/146.2–146.5
See application file for complete search history.

(56) References Cited

U.S. PATENT DOCUMENTS

| 4,224,597 | A | * | 9/1980 | DiCecio | 340/444 |
| 5,587,698 | A | * | 12/1996 | Genna | 340/442 |
| 7,271,708 | B2 | * | 9/2007 | Nakatani et al. | 340/442 |
| 2011/0164135 | A1 | * | 7/2011 | Schofield et al. | 348/148 |
| 2012/0044064 | A1 | * | 2/2012 | Maekawa et al. | 340/447 |

FOREIGN PATENT DOCUMENTS

| EP | 1889736 | 2/2008 |
| GB | 2251947 | 7/1992 |
| JP | 2010006217 | 1/2010 |

OTHER PUBLICATIONS

Extended European Search Report dated Aug. 20, 2014 in European Application No. 14165641.3.

* cited by examiner

*Primary Examiner* — Jeffery Hofsass
(74) *Attorney, Agent, or Firm* — Snell & Wilmer, LLP

(57) ABSTRACT

Tire pressure monitoring systems and methods for detecting a tire burst are disclosed. The system may include a tire pressure sensor, a tire pressure monitor, and a tire burst indicator. The tire pressure sensor may measure tire pressure in an aircraft tire. The tire pressure monitor may analyze data from the tire pressure sensor to detect a tire burst. A tire burst may be detected in response to a rapid decrease in tire pressure. In response to detecting a tire burst, the tire pressure monitor may transmit a tire burst message to the tire burst indicator. The tire burst indicator may indicate to a pilot that a tire burst has been detected.

17 Claims, 2 Drawing Sheets

SYSTEM AND METHOD FOR TIRE BURST DETECTION

FIELD

The present disclosure relates to aircraft tires, and more particularly, to detecting tire burst conditions in aircraft tires.

BACKGROUND

Aircraft tires are designed to withstand heavy loads. The tires may be under high pressure in order to support the weight of the aircraft. During takeoff and landing, pilots must be aware of a large number of variables. Displaying tire pressure to a pilot may be less important than many other readings during takeoff and landing. Thus, this information is often not displayed. In the event of a tire burst, the pilot may hear a loud explosion-like noise. However, the pilot may not be aware of the cause, and may unnecessarily abort the takeoff.

SUMMARY

A system for detecting a tire burst is disclosed, In various embodiments, the system may comprise a tire pressure sensor, a tire pressure monitor for registering a tire burst in response to a decrease in tire pressure measured by the tire pressure sensor, and a tire burst indicator which indicates a tire burst in response to the tire pressure monitor registering the tire burst. The tire pressure monitor may determine that the decrease in tire pressure is not caused by a tire pressure leak.

Methods for detecting a tire burst are disclosed. In various embodiments, a method may include measuring a the pressure with a tire pressure sensor. A tire pressure monitor may determine that a tire burst has occurred in response to a decrease in the tire pressure. A tire burst indicator may indicate that the tire burst has occurred.

In various embodiments, a computer-readable medium may cause a computer-based system for detecting a tire burst to perform operations including measuring a tire pressure with a tire pressure sensor. The operations may include determining that a tire burst has occurred in response to a decrease in the tire pressure. The operations may further include indicating that the tire burst has occurred with a tire burst indicator.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for detecting a the burst are disclosed. Aircraft landing gear may include multiple tires. One or more tires may include a tire pressure sensor. The tire pressure sensor may transmit tire pressure measurements to a tire pressure monitor which is configured to detect a tire burst in the tire. The tire burst may be indicated to a pilot, co-pilot, or an electronic processor via a tire burst indicator, and, for example, the pilot may react accordingly. "Burst" may include any rapid loss of pressure in a short amount of time (e.g., a separation of the rubber, etc.). A "short amount of time" may be from about 1 ms to 1 s.

Figure 1:
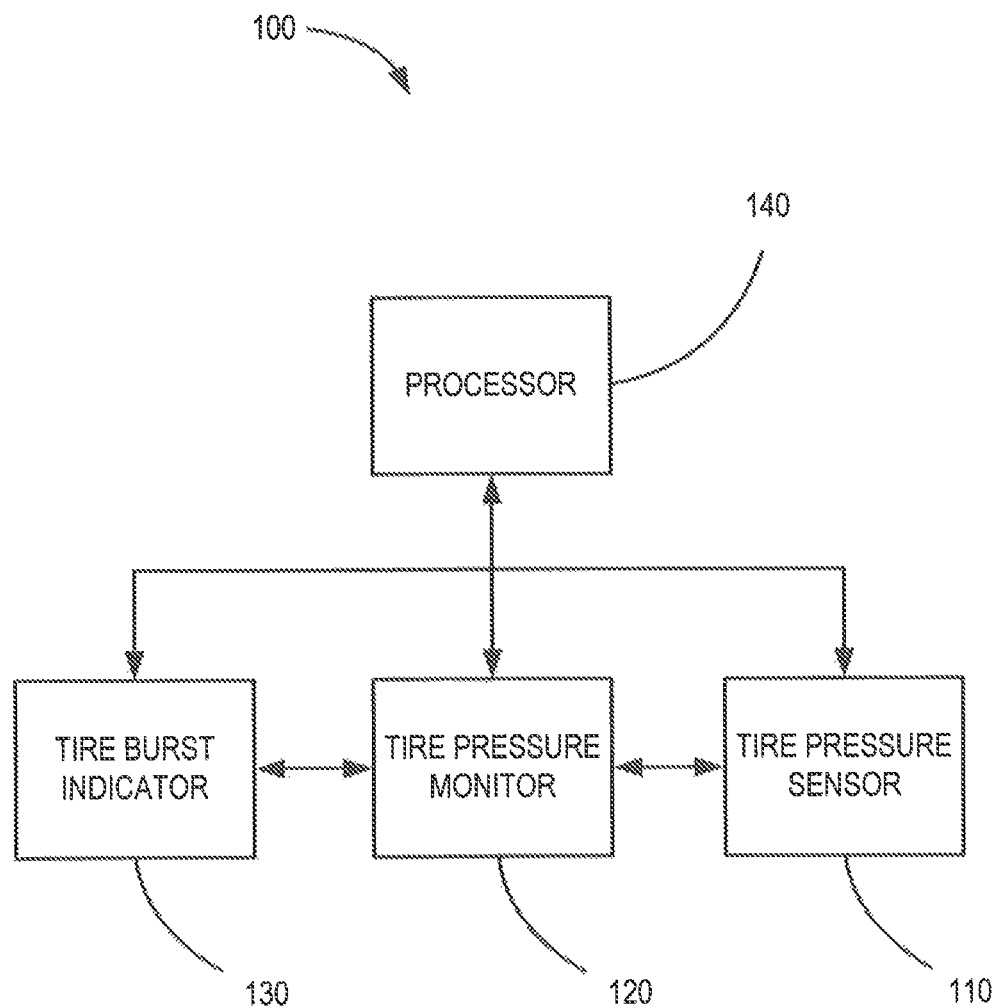
FIG. 1 illustrates, in accordance with various embodiments, a block diagram of a system for detecting a tire burst.

Referring to FIG. 1, a block diagram of a tire pressure monitoring system ("TPMS") 100 for detecting a tire burst is illustrated according to various embodiments. TPMS 100 may comprise tire pressure sensor 110, tire pressure monitor 120, and tire burst indicator 130. Tire pressure sensor 110, tire pressure monitor 120, and tire burst indicator 130 may be configured to communicate with each other. In various embodiments, at least one of tire pressure sensor 110, tire pressure monitor 120, and tire burst indicator 130 may comprise or be coupled to a processor 140. In various embodiments, the system components may communicate electronically via analog and/or digital signals. However, in various embodiments, one or more of the system components may communicate wirelessly.

Tire pressure sensor 110 may be coupled to a tire to measure a tire pressure in the tire. In various embodiments, the tire may be an aircraft tire. An aircraft may comprise a plurality of tire pressure sensors 110, and each tire pressure sensor may be coupled to a tire. Tire pressure sensor 110 may comprise any type of tire pressure sensor capable of detecting a rapid decrease in pressure of a tire. Tire pressure sensor 110 may be in fluid communication with a tire, which thus allows tire pressure sensor 110 to monitor the pressure of the tire.

In various embodiments, TPMS 100 may use a wireless enabled pressure reading device in fluid communication with a tire. Tire pressure sensor 110 may measure tire pressure by way of its fluid communication channel with the tire. Tire pressure sensor 110 may then transmit pressure information wirelessly (e.g., via radio frequency ("RF") signal) to tire pressure monitor 120 for monitoring. In various embodiments, tire pressure sensor 110 may further comprise an analog-digital converter, microcontroller, system controller, oscillator, radio frequency transmitter, low frequency receiver, and voltage regulator all mounted to a valve stem inside the tire. The system may further comprise a battery, housing, and printed circuit board ("PCB") located external to the tire. Many aircraft are equipped with tire pressure sensors, and tire pressure sensors are not described in detail herein. Various types of tire pressure sensors are compatible with the present disclosure, and any particular tire pressure sensors are recited by way of example only, and are not intended to limit the disclosure.

Tire pressure sensor 110 may output data indicative of tire pressure (i.e., tire pressure data), for example, continuously or at various intervals. Tire pressure sensor 110 may output data in an analog manner, such has by supplying an output voltage that varies in accordance with tire pressure. Tire pressure sensor 110 may output data in a digital manner, such as by supplying an output stream of bits at regular intervals in accordance with tire pressure. For example, tire pressure sensor 110 may output hits indicative of tire pressure at a rate of 60 Hz. Tire pressure sensor 110 may include an analog to digital convertor to facilitate digital output. In various embodiments, the output of tire pressure sensor 110 may be conditioned or filtered prior to transmission to tire pressure monitor 120. For example, signal filtering may reduce errors.

Tire pressure monitor 120 may comprise any combination of hardware and/or software capable of analyzing tire pressure data received from tire pressure sensor 110. In various embodiments, tire pressure monitor 120 may be integrated into tire pressure sensor 110 or tire burst indicator 130.

Tire pressure monitor 120 may be in electrical, wireless or other type of communication with tire pressure sensor 110 to receive information from tire pressure sensor 110. Tire pressure monitor 120 may contain a computing device (e.g., a processor) and an associated memory. The associated memory may comprise an article of manufacture including a tangible, non-transitory computer-readable storage medium having instructions stored thereon that, in response to execution by a computing device (e.g., a processor), cause the computing device to perform various methods.

Tire pressure monitor 120 may be configured to determine whether a tire burst has occurred based on tire pressure readings from tire pressure sensor 110. A tire burst may be evidenced by a large drop in tire pressure over a short period of time. In various embodiments, tire pressure monitor 120 is able to determine by a rapid decrease in tire pressure that a tire burst has occurred, as opposed to a tire pressure leak. A tire pressure leak may not be as important to notify the pilot during complex maneuvers, such as takeoff, as opposed to a tire burst, which may have been accompanied by a loud explosion audible to the pilot. Thus, in various embodiments, tire pressure monitor 120 distinguishes between a tire burst and a tire leak in determining whether to notify the pilot. As used herein, a tire leak may refer to a small loss of tire pressure over time.

In various embodiments, a tire burst may be detected if a tire loses at least 50% of tire pressure within 50 milliseconds (ms), and at least 90% tire pressure within 200 ms. Standard aircraft tire pressure varies based on the tire and the aircraft. However, many aircraft tires have a steady-state pressure of around 200 psi. Thus, for a 200 psi tire, a tire burst may be detected if the tire falls below 100 psi within 50 ms and below 20 psi within 200 ms. In various embodiments, the processor must detect both the 50% decrease and the 90% decrease in order to register a tire burst. Detecting both decreases in pressure may reduce false positives; however, in various embodiments, only one measured decrease in pressure may be desired or required. In various embodiments, tire pressure monitor 120 may register a tire burst when either the tire loses 50% tire pressure within 50 ms or 90% tire pressure within 200 ms.

The tire pressure decrease signature will be significantly different for a tire burst compared to a tire pressure leak. The threshold time for a percentage decrease in order to register a tire burst may vary in various embodiments, for example 50% within 10 ms or 100 ms. However, the threshold should be set sufficiently high in order to prevent false positives from rapid tire leaks. By keeping the timeline under one second, false positives may be significantly reduced. Accordingly, tire pressure loss of 50% over a period greater than 2 seconds may be referred to as a tire leak and not a tire burst.

In various embodiments, tire pressure monitor 120 may register a tire burst based on a rate of change of tire pressure. For example, tire pressure monitor 120 may register a tire burst in response to a tire pressure decrease of greater than 1,000 psi/second. For example, if a 220 psi tire dropped to 80 psi in 17 ms, the rate of decrease would be 4,700 psi/second, and processor 120 would register a tire burst. In various embodiments, tire pressure monitor 120 may register a tire burst in response to a tire pressure decrease of greater than at least 200 psi/sec or 2,000 psi/sec. Based on varying tire and aircraft specifications, an appropriate threshold decrease rate may be selected in order to minimize false positives from rapid tire leaks. In various embodiments, tire pressure monitor 120 may be required to measure both a rate of decrease greater than 1,000 psi/second and a drop in pressure of greater than 90% in order to register a tire burst.

In response to registering a tire burst, tire pressure monitor 120 may cause tire burst indicator 130 to indicate that a tire burst has occurred. Tire burst indicator 130 may comprise any device capable of providing an alert to a pilot, other aircraft crew member, air traffic controller, and/or processor or other aircraft component. A pilot may be an onboard pilot and an aircraft controller may be any remote individual with decision-making authority regarding the control of an aircraft including manned or unmanned aircraft. In various embodiments, tire burst indicator 130 may be located within a cockpit of an aircraft. However, tire burst indicator 130 may be located in an air control tower, at a remote pilot station, or any other location. In various embodiments, tire burst indicator 130 may comprise a light, gauge, speaker, screen, heads up display, etc. Tire burst indicator 130 may be integrated with a cockpit display system and/or a glass cockpit. In various embodiments, a pilot may be monitoring displays on an LCD or LED monitor during takeoff. In response to tire pressure monitor 120 registering a tire burst, tire burst indicator 130 may display a message on the LCD monitor such as a message stating, "TIRE BURST DETECTED". In various embodiments, tire burst indicator 130 may indicate which tire has burst. At least one of tire pressure monitor 120 and tire burst indicator 130 may also comprise a processor for receiving output from tire pressure monitor 120. Tire burst indicator 130 may receive an indication that a tire has burst from tire pressure monitor 120, and may take responsive action in various embodiments.

In various embodiments, tire burst indicator 130 may comprise a binary indicator. As used herein, a binary indicator is an indicator which only comprises a burst state and a non-burst state for a given tire. Thus, even if a tire is low on pressure or even lost all pressure, the binary indicator will remain in the non-burst state unless a tire burst has been detected, and the low pressure information will not be indicated by the binary indicator. The binary indicator may prevent indication of a low-pressure tire from distracting a pilot from more critical displays. For example, a simple binary indicator may comprise a light bulb which illuminates in response to detection of a tire burst, and is non-illuminated at all other times. In various embodiments, the binary indicator displays a message or symbol on a portion of a monitor during the burst state, and during the non-burst state, no message or symbol is displayed, so the monitor may be used for other purposes while the binary indicator is in a non-burst state. In various embodiments, a binary indicator in the burst state may be accompanied by a message indicating which tire has burst.

Figure 2:
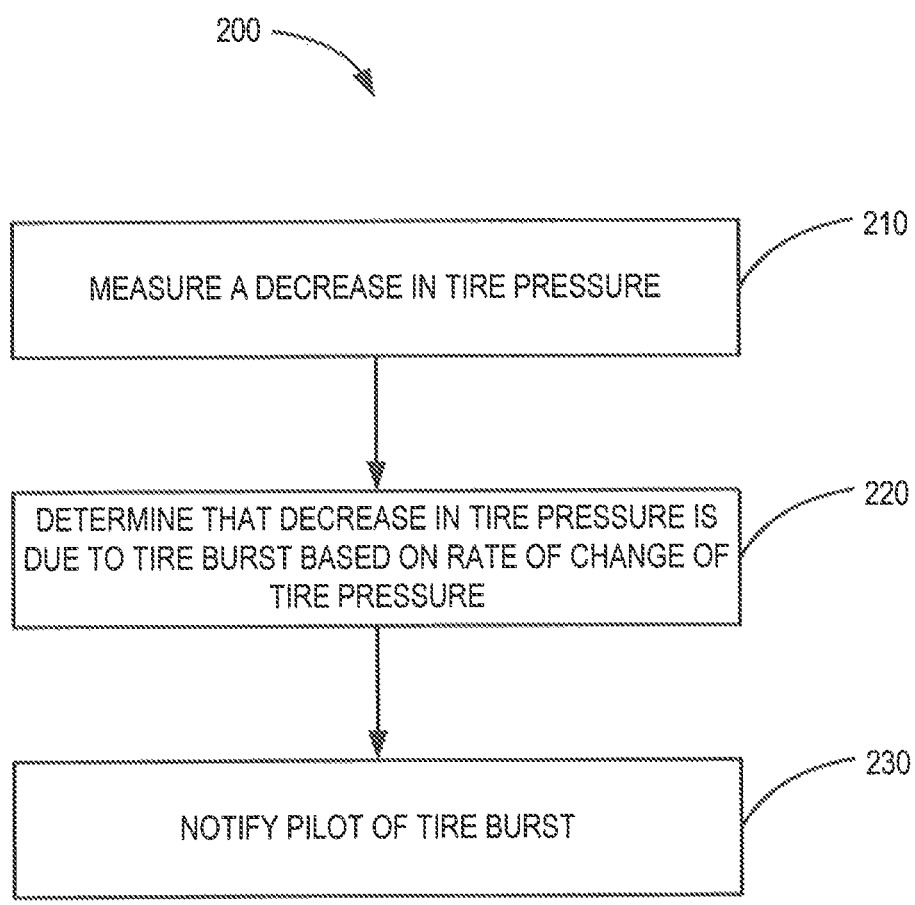
FIG. 2 illustrates, in accordance with various embodiments, a method for detecting a tire burst.

Referring to FIG. 2, a process 200 for detecting a tire burst is illustrated according to various embodiments. The process may include measuring a decrease in tire pressure (Step 210). The decrease in tire pressure may be measured by any method known in the art. In various embodiments, a tire pressure sensor 110 in a tire may measure the decrease in tire pressure. In various embodiments, the decrease in tire pressure may be associated with a sound which is audible to a pilot. In various embodiments, the tire pressure is continually measured. However, in various embodiments, the tire pressure may be measured at set intervals, such as once every millisecond or once every five milliseconds.

The tire pressure measurements may be transmitted to a tire pressure monitor 120. In various embodiments, the tire pressure measurements may be transmitted wirelessly. However, in various embodiments, the tire pressure sensor 110 and the tire pressure monitor 120 may be electrically coupled, or the tire pressure monitor 120 may be a component of the tire pressure sensor 110.

The tire pressure monitor 120 may analyze the tire pressure measurements to determine that a tire burst has occurred (Step 220). In various embodiments, the tire pressure monitor 120 may determine that a tire burst has occurred in response to detecting a rate of change of the tire pressure above a threshold. For example, the tire pressure monitor 120 may determine that a tire burst has occurred in response to detecting a rate of decrease in tire pressure of at least 1,000 psi/second. In various embodiments, the decrease rate must be sustained for a minimum period of time, such as at least 5 milliseconds. In various embodiments, the tire pressure monitor 120 may determine that a tire burst has occurred in response to detecting a percentage decrease of tire pressure within a set period of time. For example, in various embodiments the tire pressure monitor 120 may determine that a tire burst has occurred in response to detecting a 50% decrease in tire pressure within 50 ms, and/or a 90% decrease in tire pressure within 200 ms. Based on the tire pressure measurements, the tire pressure monitor 120 may determine that the decrease in tire pressure is not attributable to a leak, and the tire pressure monitor 120 may register a tire burst.

In response to registering a tire burst, the tire pressure monitor 120 may transmit a tire burst message to a tire burst indicator 130. In various embodiments, the tire burst message may comprise information regarding which tire has burst. For example, the message may comprise information that the left outboard tire has burst.

In response to receiving the tire burst message, the tire burst indicator 130 may indicate to a pilot or aircraft crew member and/or a processor that a tire burst has occurred (Step 230). The indication may be made by any method, such as illuminating a light, displaying a message on a screen, or giving the pilot an audible warning. The pilot may then determine the appropriate course of action. For example, the pilot may hear an explosion when a tire bursts prior to takeoff and contemplate rejecting the takeoff. However, when the tire burst indicator 130 indicates a tire burst, the pilot may determine that the safest course of action is to continue with the takeoff.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for detecting a tire burst comprising:
   a tire pressure sensor;
   a tire pressure monitor for registering the tire burst in response to a decrease in tire pressure measured by the tire pressure sensor; and
   a binary tire burst indicator which indicates the tire burst in response to the tire pressure monitor registering the tire burst, wherein the binary tire burst indicator is configured to prevent indication of a low-pressure tire.

2. The system of claim 1, wherein the binary tire burst indicator indicates which tire has burst.

3. The system of claim 1, wherein the tire pressure monitor registers the tire burst in response to the tire pressure decreasing by greater than 50% within 50 milliseconds.

4. The system of claim 1, wherein the tire pressure monitor registers the tire burst in response to detecting a rate of decrease of the tire pressure of at least 1,000 psi per second.

5. The system of claim 1, wherein the tire pressure monitor identifies a tire pressure leak.

6. The system of claim 1, wherein the binary tire pressure sensor is coupled to an aircraft tire.

7. A method comprising:
measuring a tire pressure with a tire pressure sensor;
determining, by as processor and in response to a decrease in the tire pressure, that a tire burst has occurred; and
indicating, with a binary tire burst indicator, that the tire burst has occurred, wherein the binary tire burst indicator is configured to prevent indication of a low-pressure tire.

8. The method of claim 7, wherein the tire pressure decreases by a rate of at least 1,000 psi per second.

9. The method of claim 7, further comprising transmitting, by the tire pressure monitor, a tire burst message to the binary tire burst indicator.

10. The method of claim 7, wherein the tire pressure monitor determines that the tire burst has occurred in response to at least one of a detecting a decrease of at least 50% of the tire pressure within 50 milliseconds and a decrease of at least 90% of the tire pressure within 200 milliseconds.

11. The method of claim 7, wherein the binary tire burst indicator indicates the tire burst to a pilot during takeoff.

12. The method of claim 7, further comprising identifying, by the tire pressure monitor, a leak.

13. An article of manufacture including a tangible, non-transitory computer-readable storage medium having instructions stored thereon that, in response to execution by a computer-based system for detecting a tire burst, cause the computer-based system to perform operations comprising:
measuring, by the computer-based system, a tire pressure with a tire pressure sensor;
determining, by the computer-based system and in response to a decrease in the tire pressure, that a tire burst has occurred; and
indicating, by the computer-based system and with a binary tire burst indicator, that the tire burst has occurred, wherein the binary tire burst indicator is configured to prevent indication of a low-pressure tire.

14. The article of manufacture of claim 13, wherein the tire pressure decreases by a rate of at least 1,000 psi per second.

15. The article of manufacture of claim 13, the operations further comprising transmitting, by the computer-based system, a tire burst message to the binary tire burst indicator.

16. The method of claim 13, wherein the computer-based system determines that the tire burst has occurred in response to at least one of a detecting a decrease of at least 50% of the tire pressure within 50 milliseconds and a decrease of at least 90% of the tire pressure within 200 milliseconds.

17. The method of claim 13, wherein the binary tire burst indicator indicates the tire burst to a pilot during takeoff.

\* \* \* \* \*